US009086490B2

(12) United States Patent
Cocks et al.

(10) Patent No.: US 9,086,490 B2
(45) Date of Patent: Jul. 21, 2015

(54) RED BORON SOLID STATE DETECTOR

(71) Applicants: Franklin H. Cocks, Durham, NC (US);
Walter N. Simmons, Bahama, NC (US)

(72) Inventors: Franklin H. Cocks, Durham, NC (US);
Walter N. Simmons, Bahama, NC (US)

( * ) Notice: Subject to any disclaimer, the term of this patent is extended or adjusted under 35 U.S.C. 154(b) by 0 days.

(21) Appl. No.: 14/454,909

(22) Filed: Aug. 8, 2014

(65) Prior Publication Data

US 2015/0060680 A1    Mar. 5, 2015

Related U.S. Application Data

(60) Provisional application No. 61/870,399, filed on Aug. 27, 2013.

(51) Int. Cl.
*G01T 3/08*    (2006.01)

(52) U.S. Cl.
CPC ........................................ *G01T 3/08* (2013.01)

(58) Field of Classification Search
CPC .................................... G01T 3/08; G01T 3/00
USPC .................................................... 250/370.05
See application file for complete search history.

(56) References Cited

U.S. PATENT DOCUMENTS

| 4,064,521 | A | 12/1977 | Carlson |
| 6,440,786 | B1 * | 8/2002 | Dowben ........................ 438/183 |
| 6,727,504 | B1 | 4/2004 | Doty |
| 6,771,730 | B1 | 8/2004 | Dowben et al. |
| 7,375,343 | B1 * | 5/2008 | Cook et al. ............... 250/390.01 |
| 8,445,859 | B2 | 5/2013 | Wang et al. |
| 2011/0220915 | A1 * | 9/2011 | Edgar et al. ..................... 257/77 |

OTHER PUBLICATIONS

B.L. Zalph, L.J. Dimmey, H. Park, P.L. Jones, F.H. Cocks, "Hydrogenated Amorphous Boron: Resistivity and Doping Behavior," Physica Status Solidi, vol. 62a, 1980, pp. K185 to K188.
GOA-11-753, "Technology Assessment: Neutron Detectors—Alternatives to using helium-3," GAO Report, Sep. 2011, 61 pp.

* cited by examiner

*Primary Examiner* — Marcus Taningco

(57) ABSTRACT

A solid state detector with alpha rhombohedral red boron is disclosed. The solid state detector detects neutrons, especially thermal neutrons. The detector may include a body of alpha rhombohedral red boron disposed between electrodes, a power supply for applying a voltage to said electrodes, and a detecting device that detects and measures a current pulse emitted from said body of alpha rhombohedral red boron to detect the neutrons.

13 Claims, 2 Drawing Sheets

RED BORON SOLID STATE DETECTOR

RELATED APPLICATIONS

This application claims the benefit of U.S. Provisional App. No. 61/870,399 filed Aug. 27, 2013, which is incorporated herein by reference.

TECHNICAL FIELD

This application relates to the field of semiconductors and, in particular, a semiconductor solid state detector using alpha rhombohedral red boron in which neutrons are detected by current pulses produced by the interaction of neutrons with alpha rhombohedral red boron.

BACKGROUND OF THE INVENTION

Many types of neutron detectors have been developed, but all have limitations. $^{10}$B, $^{3}$He, and $^{6}$Li have long been used in neutron detectors, but the supply of $^{3}$He is extremely limited. In gas-based neutron detectors containing $^{10}$BF$_3$ or $^{3}$He, the $^{10}$B or $^{3}$He serve as a converter medium to produce ionizing radiation from an incident neutron flux. A variety of $^{3}$He, $^{10}$B neutron detectors are known as well as scintillation detectors containing $^{6}$Li, but all suffer from the relatively low total number of boron, helium, or lithium atoms per unit volume. That is why neutron gas detectors are pressurized. Boron-lined proportional detectors are also widely used for detecting thermal neutrons. None of these detectors could approach the unit-volume density of boron atoms in solid-state boron detectors. Natural boron contains 19.6% of the isotope $^{10}$B and 80.4% of the isotope $^{11}$B, but only $^{10}$B interacts with neutrons, especially thermal neutrons, enabling the detection of neutrons via the reaction $^{10}$B(n, α) $^{7}$Li, and it is the alpha particles, α, and the lithium ions which are produced by this reaction that enable this isotope to be useful for the detection of neutrons.

Because of its large neutron cross section, $^{10}$B has long been used in neutron counters, based on the reaction:

In $^{3}$He detectors the reaction is:

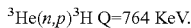

Because the cross section for the reaction for $^{3}$He is about 1.4 times greater than that for the $^{10}$B reaction, current $^{3}$He neutron detectors are more sensitive than current $^{10}$B neutron detectors. In both types of gas-based neutron detectors (containing BF$_3$ or $^{3}$He), the $^{10}$B or $^{3}$He serve as a converter medium to produce ionizing radiation from an incident neutron flux. In both cases their sensitivity is limited by the density of $^{10}$B or $^{3}$He atoms that are contained in the detector. That is why neutron gas detectors are pressurized. Even so, the density of detection nuclides in gas detectors (or current solid state detectors) cannot approach the density of the detection nuclides that can be achieved in a bulk solid, crystalline red boron detector. In gas detectors, measurement of the ionizing radiation produced by the interaction of neutrons with either $^{3}$He or $^{10}$B provides the measure of the incident neutron flux. A variety of $^{3}$He or $^{10}$B containing neutron detectors are known, but all suffer from the relatively low total number of boron or helium atoms that can act as neutron-to-ionizing radiation converters. Additionally, the national supply of $^{3}$He is extremely limited but $^{10}$B constitutes 19.78% of natural boron.

$^{10}$B doping of standard semiconductors such as silicon or germanium does not produce sensitive neutron detectors because of the very low level of $^{10}$B they contain. Semiconductor neutron detectors have been severely handicapped by their low density of the neutron absorbing species, and attempts have been made to overcome this deficiency by the use of coatings, but such coatings must be thin.

In a pure crystalline boron or amorphous solid state pure boron detector, the density of boron atoms in the detector would be more than 500 times higher than that obtainable with $^{10}$B gas detectors pressurized to ten atmospheres and millions of times higher than current semiconductor neutron detectors that use boron as a dopant material. The semiconducting properties of beta rhombohedral boron, amorphous boron, tetragonal boron, and orthorhombic boron are extremely poor because of the deep and numerous trapping centers that exist in these materials due to their extremely complicated atomic structures. Because of these poor semiconducting properties, millions of electron-hole pairs produced by neutron interaction with the boron isotope $^{10}$B cannot be collected or produce any signal. Neutron detectors using these forms of boron consequently do not have good sensitivity.

U.S. Pat. No. 8,445,859 B2 to Wang et al., entitled "Neutron Detectors Comprising Boron Powder," which is incorporated herein by reference, discloses the use of $^{10}$boron powder, $^{10}$boron carbide powder or combinations thereof directly deposited on a first conductive substrate for the detection of neutrons. Powdered boron is amorphous with no crystalline structure but its $^{10}$B isotope atoms react with neutrons to produce alpha particles. These alpha particles produce electron—hole pairs but amorphous boron is not a good semiconductor. The charge carriers which the interaction of $^{10}$B with neutrons in boron powder produces cannot be collected effectively for the same reasons they can't be collected efficiently in beta rhombohedral, tetragonal, or orthorhombic solid boron because these forms of boron have a high density of trapping centers. These trapping centers lead to the recombination of hole electron pairs before they can be collected by the measuring circuit. Wang, et al. do not disclose the use of crystalline alpha rhombohedral boron as a neutron detector.

U.S. Pat. No. 6,727,504 B1 to F. Patrick Doty, which is incorporated herein by reference, discloses the use of boron nitride as a solid state neutron detector. Doty discloses that boron nitride has a much higher concentration of boron atoms per unit volume than do BF$_3$ neutron detector tubes, but boron nitride is also a very poor semiconductor, hence a majority of the hole—electron pairs produced by neutrons interacting with $^{10}$B atoms become trapped and annihilated, vitiating the advantages offered by the fact that the concentration of boron atoms in boron nitride is much higher than that in BF$_3$ tubes. Doty does not disclose the use of crystalline alpha rhombohedral boron as a neutron detector U.S. Pat. No. 6,771,730 B1 to Dowben et al., which is incorporated herein by reference, discloses the use of boron-carbide as a solid state neutron detector and method for using the same. Boron nitride has a greater density of boron atoms per unit volume than boron trifluoride gas detectors but the semiconducting properties of boron carbide are poor. Dowben, et al do not disclose a neutron detector that uses alpha rhombohedral red boron.

Accordingly, it would be desirable to provide a neutron detector having enhanced unit-volume sensitivity using crystalline alpha rhombohedral boron.

BRIEF DESCRIPTION OF THE DRAWING

Embodiments of the system described herein are explained with reference to the several figures of the drawings, which are briefly described as follows.

SUMMARY OF THE INVENTION

Figure 1:
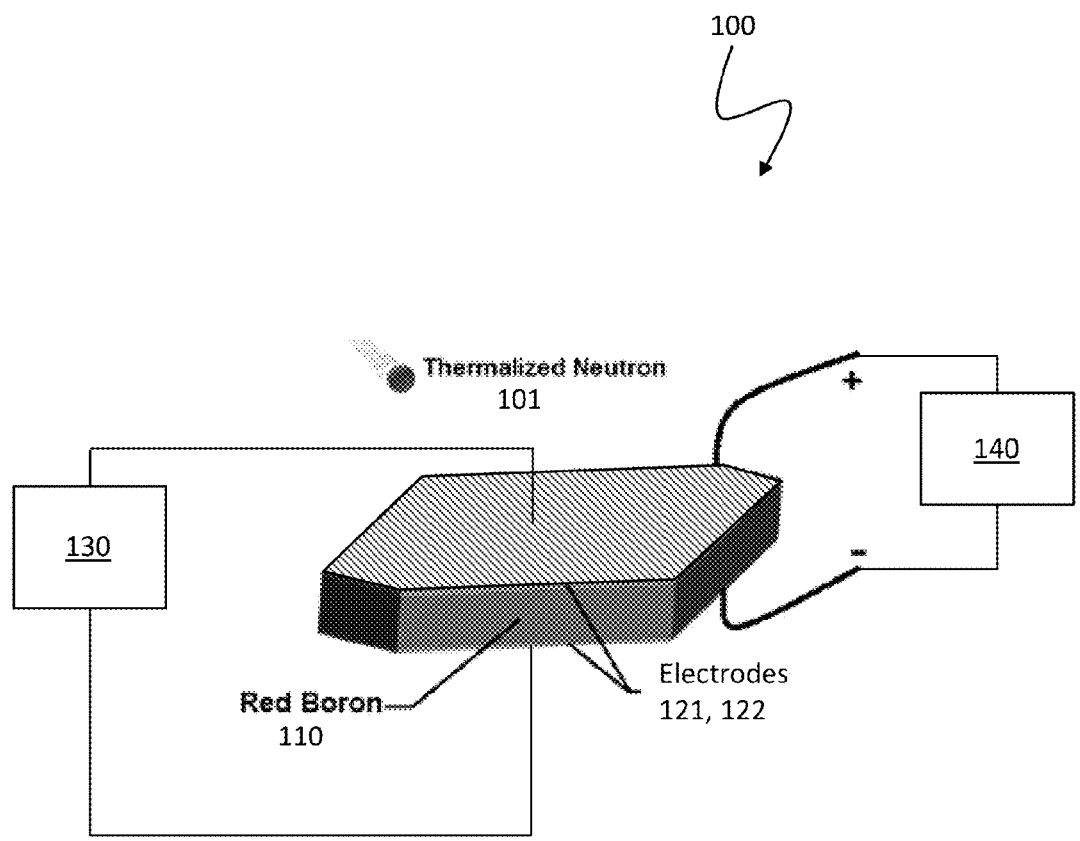
FIG. 1 is a schematic illustration showing a configuration of an alpha rhombohedral red boron neutron detector according to an embodiment of the system described herein.

According to the system described herein, a device for detecting neutrons includes a body of alpha rhombohedral red boron disposed between electrodes. A power supply applies a voltage to the electrodes. A detecting device detects and measures a current pulse emitted from the body of alpha rhombohedral red boron to detect the neutrons. The body of alpha rhombohedral red boron may be a single crystal of alpha rhombohedral red boron and/or may comprise multiple crystals of alpha rhombohedral red boron. The body of alpha rhombohedral red boron may be intrinsic red boron. The detecting device may include a charge-sensitive preamplifier feeding a shaping amplifier and a multi-channel analyzer.

According further to the system described herein, a method for detecting neutrons includes providing a body of alpha rhombohedral red boron disposed between electrodes, wherein said electrodes are disposed on opposing faces of said solid body. A bias voltage is applied between the electrodes. The body of alpha rhombohedral red boron is exposed to a flux of neutrons. The current pulse produced from the exposure to the flux of neutrons is measured in order to detect the neutrons. The body of alpha rhombohedral red boron may be intrinsic red boron.

According further to the system described herein, a device for detecting neutrons includes a body of alpha rhombohedral red boron disposed between electrodes. A power supply applies a voltage to said electrodes. A detecting device detects and measures a current pulse emitted from the body of alpha rhombohedral red boron to detect the neutrons. The electrodes have a maximum separation spacing of less than 5 millimeters. An optimization parameter, $\alpha$, of the body of alpha rhombohedral red boron as a neutron detector is given by the following equation:

$$\alpha = (\mu_h t_h + \mu_e t_e)\rho$$

wherein:
$\mu_e$ is a product of a mobility of electrons,
$t_e$ is a lifetime of excess electrons,
$\mu_h$ is a mobility of holes,
$t_h$ is a lifetime of excess holes, and
$\rho$ is an electrical resistivity of the red boron.

The effectiveness parameter $\alpha$ is greater than 1 (cm$^3$-ohm)/volt and less than $10^{10}$ (cm$^3$-ohm)/volt. The electron mobility $\mu_e$ is between 100 and 1000 m$^2$/volt-second. The hole mobility $\mu_h$ is between 10 and 100 m$^2$/volt-second. The excess electron and hole lifetimes $t_e$ and $t_h$ are between $10^{-7}$ and $10^{-2}$ seconds. The electrical resistivity $\rho$ is between $10^5$ and $10^9$ ohm-cm. The detecting device may include a charge-sensitive preamplifier feeding a shaping amplifier and a multi-channel analyzer.

DETAILED DESCRIPTION OF VARIOUS EMBODIMENTS

Alpha-rhombohedral red boron is an elemental semiconductor, but it can only be prepared with difficulty, and it has not been extensively studied. It has been discovered that this allotrope of boron, unlike having a high unit-volume sensitivity that cannot be achieved by other neutron detectors and concomitantly neutron detectors of high sensitivity. The September 2011 GAO report entitled "Technology Assessment Report "Neutron Detectors—Alternatives to Using Helium-3" considered many different possibilities for developing neutron detectors that do not use Helium-3, but this report made no mention of alpha rhombohedral red boron.

Alpha-rhombohedral boron is called "red boron" because this is the color of its transparent crystals. Red boron solid-state neutron detectors have a sensitivity for the detection of neutrons more than 500 times greater than detectors made from present used semiconductors or from the commonly used boron trifluoride or helium three gas neutron detectors, or lithium-six scintillation neutron detectors. Red boron neutron detectors have been discovered to act effectively in detecting neutrons because neutrons absorbed by the $^{10}$B atoms in red boron lead to the generation of millions of electron-hole pairs that can be swept through the body of the device by an applied electric field and then collected to produce an electronic pulse that can be quantitatively measured to a high sensitivity with standard electronic instrumentation. Amorphous boron, beta-rhombohedral, orthorhombic boron and alpha tetragonal boron are readily available, as are boron compounds such as boron carbide and boron nitride, but they are all handicapped for neutron detector use because of their extremely low carrier mobility and very short carrier lifetimes, dominated by a very high density of electron and hole traps that cannot be mediated by hydrogen saturation. Red boron has a large band gap because it is transparent, which large band gap also means that red boron neutron detectors can function at elevated temperatures while still maintaining high carrier mobility and high carrier lifetime.

Existing solid state neutron detectors, such as those based on silicon doped with boron, typically produce more than one million hole-electron pairs per neutron-boron event. These semiconductors are well developed and have high carrier mobilities and long carrier lifetimes but have low neutron sensitivity due to their low boron concentration. They are also handicapped because gamma rays produce large signals in these neutron detectors. Interference by gamma radiation is minimized in red boron neutron detectors by the very low absorption coefficient of boron for gamma radiation. This property is critical because many neutron measurements are made in situations with high gamma-ray backgrounds that confound the neutron readings produced by present neutron detectors. Red boron has the advantage that its mass absorption coefficient for gamma radiation is very small. In gas detectors, the interaction of the other necessary components of the fill gas, especially argon (for easy ionization by the induced radiation) and a discharge quench gas such as bromine (to prevent continuous gas ionization) leads to a background signal arising from the ionization of these high atomic number atoms by gamma rays. Solid state red boron neutron detectors do not need heavy element atoms and therefore the spurious signals from gamma radiation is concomitantly reduced.

Alternatives for $^3$He based neutron detectors that go beyond the detection sensitivity provided by the present $^{10}$B and $^6$Li based detector technology are urgently needed. None of the existing neutron detectors (helium-3 included) can approach the per-unit-volume sensitivity of solid-state red boron detectors.

Of all the allotropes of boron, only red boron has been found to possess good semiconducting properties. U.S. Pat. No. 4,064,521 to Carlson, which is incorporated herein by reference, discloses that semiconductor devices and in particular photovoltaic devices could be produced from hydrogenated amorphous silicon. Cocks and coworkers in a series of papers investigated the properties of hydrogenated amorphous boron to determine if hydrogenation of amorphous boron would similarly improve the semiconduction properties of hydrogenated amorphous boron. One of the papers of this group Cocks and coworkers in 1980 investigated the resistivity and doping behavior of hydrogenated amorphous boron in an effort to develop low-cost solar cells. Some of their hydrogenated amorphous boron results relating to resistivity and doping can be found in their 1980 publication in volume 62a of Physica Status Solidi on pages K185 to K188 entitled "Hydrogenated Amorphous Boron: Resistivity and Doping Behavior," which is incorporated herein by reference. This publication showed that the resistivity of hydrogenated amorphous boron could be changed by doping with either carbon or silicon. However, the semiconducting behavior of hydrogenated amorphous boron was not greatly improved. It is not known with certainty why hydrogenation improves the semiconducting properties of amorphous silicon but not amorphous boron. It is believed that hydrogenation of amorphous silicon increases the electron and hole mobility and their lifetimes by decreasing the effectiveness of the relatively shallow electron and hole traps present in amorphous silicon. The traps in hydrogenated amorphous boron are believed to be much deeper than those in amorphous silicon due to the complex bonding structure of boron compared to silicon. As a result these traps cannot be mitigated by hydrogen to the extent that the traps in amorphous silicon can be. Thus solar cells produced from hydrogenated amorphous boron are much inferior to those produced from hydrogenated amorphous silicon.

Red boron has a simpler structure than any other boron allotrope and has been found to be the only boron allotrope, including hydrogenated amorphous boron, that possesses the necessary carrier and electron-hole transport properties to act as a sensitive solid state neutron detector.

According to the system described herein, a neutron detector having enhanced unit-volume sensitivity is provided that uses the unique material alpha rhombohedral red boron.

In an embodiment, the system described herein is directed to an apparatus for the detection of neutrons and particularly thermal neutrons. The apparatus operates on the principle that an incident neutron captured by a $^{10}B$ atom is converted into highly energetic and charged particles within a solid ionizeable medium. It has been discovered that crystalline alpha rhombohedral red boron has semiconduction properties different from the other forms of boron—amorphous boron, beta rhombohedral boron, tetragonal boron, and orthorhombic boron. The mobility of electrons and holes in alpha rhombohedral red boron has been found to be more than an order of magnitude greater than the mobility of the electrons and holes in amorphous boron, beta rhombohedral boron, tetragonal boron, or orthorhorhombic boron, and in addition the lifetime of holes and electrons within alpha rhombohedral red boron is also higher than that in all other forms of boron.

According to the system described herein, it has been discovered that a red boron single crystal or multiple crystals containing $^{10}B$ atoms and disposed between at least two electrodes separated from each other by the alpha rhombohedral red boron will detect neutrons that enter the red boron and interact with its $^{10}B$ atoms, producing high energy alpha particles and lithium ions. The electrodes can be of any type, but preferably have low resistance contacts to the red boron. The electrodes are themselves electrically driven by a standard power supply and apply a bias voltage to the semiconducting alpha rhombohedral red boron single crystal or crystals. Standard devices permit measuring the current which flow through the red boron due to the bias voltage. The passage of the resultant energetic alpha particles and lithium ions in the body of the alpha rhombohedral red boron causes the appearance of non-equilibrium, excess holes and excess electrons, which increase the current flowing through the red boron. The alpha rhombohedral red boron is preferably intrinsic red boron of high electrical resistivity, preferably within the range of $10^5$ to $10^9$ ohm-cm.

FIG. 1 is a schematic illustration showing a configuration of an alpha rhombohedral red boron neutron detector 100 according to an embodiment of the system described herein. The detector includes a body of alpha rhombohedral red boron 110 between at least two electrodes 121, 122.

The two or more electrodes 121, 122 may be connected to two sides of a red boron crystal 110. An attachment wire connection or other connector to these metallic electrodes 121, 122 convey the electrical signal picked up by the electrodes to an electronic detecting device 130 for measuring and/or processing the electrical pulses detected by the contacts. The electrodes 121, 122 may be prepared using many methods, but preferably by metal evaporation or metal sputtering methods. Platinum has been found to be a preferred contact metal. Alternatively, decomposition methods may be used to produce electrical contacts formed by conductive oxide films, preferably indium-tin oxide conducting films.

A current produced by the application of a DC voltage, via a power supply 140 coupled to the electrodes 121, 122, without exposure to a neutron flux gives a measure of the background current arising from the passage of intrinsic electrons and holes that exist because of thermal excitation across the band gap of the red boron, plus any current arising from impurity doping of the alpha rhombohedral red boron. Because background current adds to any signal produced by neutrons, the red boron should be as pure as possible and have a high resistivity. The exposure of the red boron neutron detector, prepared and operated in this way, to a neutron flux 101 produces excess holes and excess electrons. The measurement of the concomitant increase in current when this detector 100 is exposed to the neutron flux gives a direct determination of the neutron flux. Measurement of the current and charge flow and the generation of the voltages applied to the contacts on a red boron detector may be carried out by the use of electrical circuits of the detecting device 130. An example electrical circuit of the detecting device 130 comprises a charge-sensitive preamplifier feeding a shaping amplifier and a multi-channel analyzer. It is noted that, in various embodiments, the power supply 140 and the detecting device 130 may be separate units and/or may be integrated as a single unit.

For a neutron detector based on red boron as a converter medium to interact with neutrons, the red boron should have semiconducting properties that allow the electrons and holes generated by these charged particles to produce current pulses that generate a measurable signal.

Because the mobility of excess electrons and holes are not the same, two different current pulses will be produced for each neutron that interacts with a $^{10}B$ atom in the body of alpha rhombohedral red boron. These current pulses are not of the same peak amplitude because holes have a lower mobility, $\mu_h$, than do electrons, $\mu_e$. Consequently their arrival time at the measuring electrode is longer than that for excess electrons. For both holes and electrons the units of mobility can be reported in units of $m^2$/volt-microsecond second.

Because excess holes move more slowly than excess electrons, the peak current detected from electrons exceeds the peak current from holes. The arrival time of the holes at a contact will occur over a longer time period than that for electrons, leading to an observably higher peak current. Both the number of excess holes and the number of excess electrons produced as a result of the interaction of neutrons with $^{10}B$ atoms are reduced as the semiconductor returns to equilibrium by recombination of excess holes and excess electrons at trapping sites. The number of these free excess charge carriers decays exponentially, with lifetimes $t_h$ and $t_e$. For both electrons and holes the units of lifetime are microseconds.

Five factors have been found to determine the effectiveness of red boron neutron detectors. The five factors are 1) the mobility of electrons, 2) the mobility of holes, 3) the lifetime of the excess electrons, 4) the lifetime of the excess holes, after they are both produced by the interaction of neutrons with $^{10}B$, and 5) the electrical resistivity of the alpha rhombohedral red boron.

It has been discovered that the optimization parameter, $\alpha$, of red boron as a neutron detector is proportional to the product of the mobility of electrons ($\mu_e$) times the lifetime of excess electrons ($t_e$) added to the product of the mobility of holes ($\mu_h$) times the lifetime of excess holes ($t_h$) added together and multiplied by the electrical resistivity ($\rho$) of the red boron. Mathematically this relationship can be written as (Equation 1):

$$\alpha=(\mu_h t_h + \mu_e t_e)\rho \qquad \text{EQ. 1}$$

When the electron and hole nobilities have the units of $m^2$/volt-second and the electrical resistivity has the units of ohm-centimeters, according to the system described herein it has been discovered that the sensitivity parameter of the red boron neutron detector is preferably between 1 ($cm^3$-ohm)/volt and $10^{10}$. In such a case, the units of the sensitivity parameter a has the units ($cm^3$-ohm)/volt.

It has been found that an excess electron mobility between 100 and 1000 $m^2$/volt-second and an excess hole mobility between 10 and 100 $m^2$/volt-second, together with excess electron and hole lifetimes between $10^{-7}$ and $10^{-2}$ seconds, and an electrical resistivity between $10^5$ and $10^9$ ohm-cm is preferred. A power supply for applying a voltage to the electrodes; together with standard electronics for detecting and measuring a current pulse emitted from the body of alpha rhombohedral red boron, with the electrodes having a maximum separation spacing of less than 5 millimeters provides a clear signal denoting the presence of neutrons.

Figure 2:
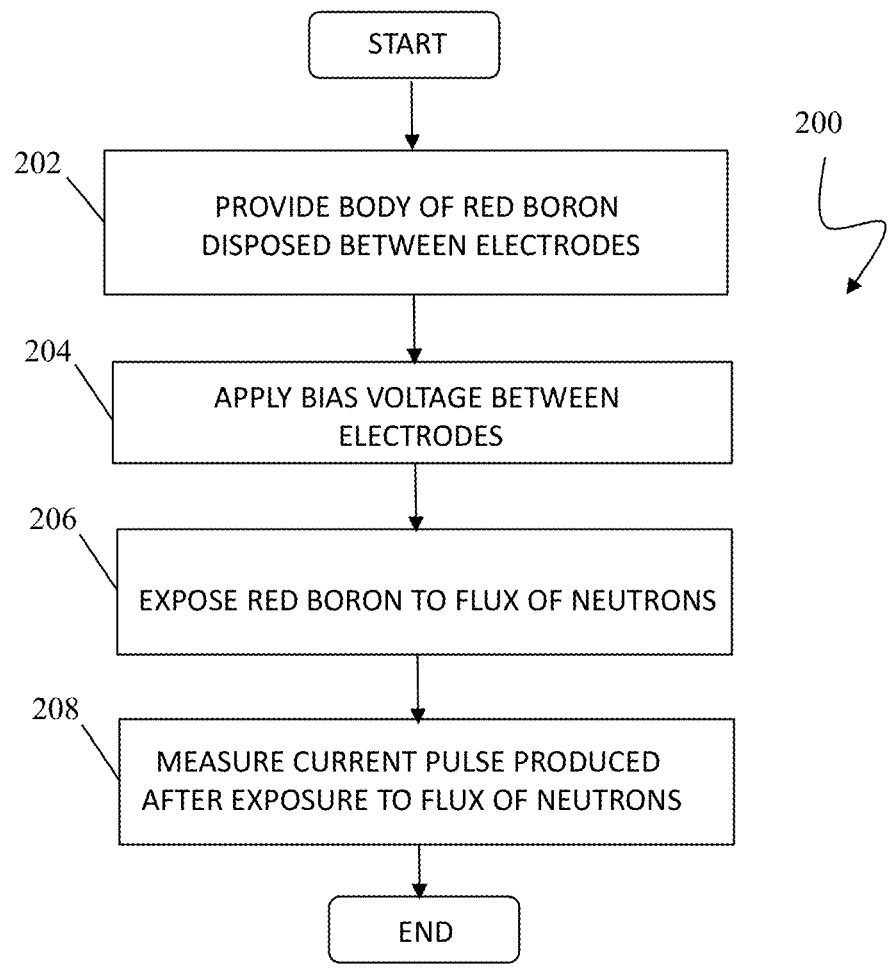
FIG. 2 is a flow diagram showing processing for detecting neutrons according to an embodiment of the system described herein.

FIG. 2 is a flow diagram 200 showing processing for detecting neutrons according to an embodiment of the system described herein. At a step 202, a body of alpha rhombohedral red boron is provided disposed between electrodes. The electrodes may be disposed on opposing faces of the solid body. The alpha rhombohedral red boron may have the characteristics and properties as discussed in detail elsewhere herein. At the step 202, at a step 204, a bias voltage is applied between the electrodes. After the step 204, at a step 206, the body of alpha rhombohedral red boron is exposed to a flux of neutrons. After the step 206, at a step 208, the current pulse produced after the exposure to the flux of neutrons is measured to indicate detection of the neutrons. Measured data of the current pulse may be measured and processed to indicate the detection of the neutrons using the detection device, as discussed in detail elsewhere herein. After the step 208, processing is complete for the iteration of processing being described.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of aspects of the system described herein may include executable code that is stored in a computer-readable medium and executed by one or to more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A device for detecting neutrons, comprising:
    a body of alpha rhombohedral red boron disposed between electrodes;
    a power supply for applying a voltage to said electrodes; and
    a detecting device that detects and measures a current pulse emitted from said body of alpha rhombohedral red boron to detect the neutrons.

2. The device for detecting neutrons as claimed in claim 1, wherein said body of alpha rhombohedral red boron is a single crystal of alpha rhombohedral red boron.

3. The device for detecting neutrons as claimed in claim 1, wherein said body of alpha rhombohedral red boron comprises multiple crystals of alpha rhombohedral red boron.

4. The device for detecting neutrons as claimed in claim 1, wherein said body of alpha rhombohedral red boron is intrinsic red boron.

5. The device for detecting neutrons as claimed in claim 1, wherein an optimization parameter, $\alpha$, of the body of alpha rhombohedral red boron as a neutron detector is given by the following equation:

$$\alpha=(\mu_h t_h + \mu_e t_e)\rho$$

wherein:
    $\mu_e$ is a product of a mobility of electrons,
    $t_e$ is a lifetime of excess electrons,
    $\mu_h$ is a mobility of holes,
    $t_h$ is a lifetime of the excess holes, and
    $\rho$ is an electrical resistivity of the red boron.

6. The device for detecting neutrons as claimed in claim 5,
    wherein the effectiveness parameter a is greater than 1 ($cm^3$-ohm)/volt and less than $10^{10}$ ($cm^3$-ohm)/volt,
    wherein the electron mobility $\mu_e$ is between 100 and 1000 $m^2$/volt-second,
    wherein the hole mobility $\mu_h$ is between 10 and 100 $m^2$/volt-second,
    wherein the excess electron and hole lifetimes $t_e$ and $t_h$ are between $10^{-7}$ and $10^{-2}$ seconds, and wherein the electrical resistivity $\rho$ is between $10^5$ and $10^9$ ohm-cm.

7. The device for detecting neutrons as claimed in claim 1, wherein the detecting device includes a charge-sensitive preamplifier feeding a shaping amplifier and a multi-channel analyzer.

8. A method for detecting neutrons, comprising:
providing a body of alpha rhombohedral red boron disposed between electrodes, wherein said electrodes are disposed on opposing faces of said solid body;
applying a bias voltage between said electrodes;
exposing said body of alpha rhombohedral red boron to a flux of neutrons; and
measuring a current pulse produced after the exposure to the flux of neutrons to detect the neutrons.

9. The method as claimed in claim 8, wherein said body of alpha rhombohedral red boron is intrinsic red boron.

10. The method as claimed in claim 8, wherein an optimization parameter, $\alpha$, of the body of alpha rhombohedral red boron as a neutron detector is given by the following equation:

$$\alpha = (\mu_h t_h + \mu_e t_e)\rho$$

wherein:
$\mu_e$ is a product of a mobility of electrons,
$t_e$ is a lifetime of excess electrons,
$\mu_h$ is a mobility of holes,
$t_h$ is a lifetime of excess holes, and
$\rho$ is an electrical resistivity of the red boron.

11. The method as claimed in claim 10,
wherein the effectiveness parameter $\alpha$ is greater than 1 $(cm^3\text{-ohm})/volt$ and less than $10^{10}$ $(cm^3\text{-ohm})/volt$,
wherein the electron mobility $\mu_e$ is between 100 and 1000 $m^2/volt\text{-second}$,
wherein the hole mobility $\mu_h$ is between 10 and 100 $m^2/volt\text{-second}$,
wherein the excess electron and hole lifetimes $t_e$ and $t_h$ are between $10^{-7}$ and $10^{-2}$ seconds, and
wherein the electrical resistivity $\rho$ is between $10^5$ and $10^9$ ohm-cm.

12. A device for detecting neutrons, comprising:
a body of alpha rhombohedral red boron disposed between electrodes;
a power supply for applying a voltage to said electrodes; and
a detecting device that detects and measures a current pulse emitted from the body of alpha rhombohedral red boron to detect the neutrons,
wherein the electrodes have a maximum separation spacing of less than 5 millimeters,
wherein an optimization parameter, $\alpha$, of the body of alpha rhombohedral red boron as a neutron detector is given by the following equation:

$$\alpha = (\mu_h t_h + \mu_e t_e)\rho$$

wherein:
$\mu_e$ is a product of a mobility of electrons,
$t_e$ is a lifetime of excess electrons,
$\mu_h$ is a mobility of holes,
$t_h$ is a lifetime of excess holes, and
$\rho$ is an electrical resistivity of the red boron,
wherein the effectiveness parameter $\alpha$ is greater than 1 $(cm^3\text{-ohm})/volt$ and less than $10^{10}$ $(cm^3\text{-ohm})/volt$,
wherein the electron mobility $\mu_e$ is between 100 and 1000 $m^2/volt\text{-second}$,
wherein the hole mobility $\mu_h$ is between 10 and 100 $m^2/volt\text{-second}$,
wherein the excess electron and hole lifetimes $t_e$ and $t_h$ are between $10^{-7}$ and $10^{-2}$ seconds, and
wherein the electrical resistivity $\rho$ is between $10^5$ and $10^9$ ohm-cm.

13. The device for detecting neutrons as claimed in claim 12, wherein the detecting device includes a charge-sensitive preamplifier feeding a shaping amplifier and a multi-channel analyzer.

* * * * *